United States Patent [19]

Miyaji

[11] Patent Number: 4,896,030

[45] Date of Patent: Jan. 23, 1990

[54] LIGHT-REFLECTIVITY CONTROLLER FOR USE WITH AUTOMOTIVE REARVIEW MIRROR USING ELECTROCHROMIC ELEMENT

[75] Inventor: Mitsuo Miyaji, Kuki, Japan

[73] Assignee: Ichikoh Industries Limited, Tokyo, Japan

[21] Appl. No.: 161,482

[22] Filed: Feb. 29, 1988

[30] Foreign Application Priority Data

Feb. 27, 1987 [JP] Japan .............................. 62-27438[U]
Jan. 22, 1988 [JP] Japan .............................. 63-5968[U]

[51] Int. Cl.$^4$ .............................................. G01J 1/20
[52] U.S. Cl. ..................................... 250/201; 350/357
[58] Field of Search ................ 250/201; 350/279, 357, 350/281, 278

[56] References Cited

U.S. PATENT DOCUMENTS

| | | | |
|---|---|---|---|
| 4,293,194 | 10/1981 | Takahashi | 350/357 |
| 4,443,057 | 4/1984 | Bauer et al. | 350/281 |
| 4,512,637 | 4/1985 | Ballmer | 350/357 |
| 4,669,825 | 6/1987 | Itoh et al. | 350/278 |
| 4,750,816 | 6/1988 | Ito et al. | 350/357 |

Primary Examiner—David C. Nelms
Assistant Examiner—Khaled Shami
Attorney, Agent, or Firm—Foley & Lardner, Schwartz, Jeffery, Schwaab, Mack, Blumenthal & Evans

[57] ABSTRACT

The light reflectivity control for use with an automotive rearview mirror according to the present invention has a first and second photosensors to detect the brightness of the surroundings including the front of a car in which the inside rearview mirror is equipped and that of the surroundings including the rear of the car, respectively. These photosensors deliver output signals in inverse proportion to the respective brightnesses of the surroundings of the car. The output signals are supplied to a first and second comparators each having at least a reference value predetermined correspondingly to the brightness of the surroundings, in which the output signals are compared with the reference values, respectively. Based on the signal including the information concerning the brightness of the surroundings including the front and rear, respectively, of the car and that are delivered from the comparators, voltages for application to the electrochromic elements and then the electrochromic elements are connected. Thereby, the voltage for application to the electrochromic elements are automatically and stepwisely correspondingly to the brightness of the surroundings of the car.

4 Claims, 4 Drawing Sheets

LIGHT-REFLECTIVITY CONTROLLER FOR USE WITH AUTOMOTIVE REARVIEW MIRROR USING ELECTROCHROMIC ELEMENT

BACKGROUND OF THE INVENTION (a) Field of the Invention:

The present invention relates to a controller used with an automotive rearview mirror using electrochromism to automatically adjust the light reflectivity of the inside rearview mirror surface stepwise accordingly to the brightness in the surroundings of the car or automobile. b) Related Art Statement:

Heretofore, automotive rearview mirrors have already been proposed of which the mirror surface is made of an electrochromic element and colored by changing the voltage applied to the electrochromic element according to the brightness of the surroundings of the automobile, thereby adjusting the light reflectivity of the mirror surface (the rearview mirror of this type will be referred to as "EC mirror" hereinafter). For example, the Applicant's copending Japanese Utility Model Application No. 60-199295 (filed on Dec. 26, 1985) discloses a controller adapted for use with such EC mirror to reduce, when the photosensor disposed at a part of the mirror housing of the EC mirror of a car is exposed to a strong light from the headlights of a car behind the light reflectivity of the EC mirror so that the driver of the car will not be dazzled by the brightness of the light from the headlights of the car behind. As known from the disclosure in the U.S. Pat. No. 4293194, the electrochromic element is of a multilayer structure in which each of two thin chromic layers is placed between transparent electrodes. The first chromic layer is made of, for example, $Ni(OH)_2$ which becomes blue when oxidized, while the second chromic layer is made of, for example, tungsten oxide $WO_3$ which is colored when deoxidized due to the oxidation of the first chromic layer.

The EC mirror using the above-mentioned electrochromic element has normally a high reflectivity but this reflectivity is automatically changed to a predetermined low reflectivity when the mirror is exposed to a strong light beam from the headlights of a car behind. However, the dazzle felt by the driver's eyes varies depending upon the intensity of the light from the headlights of the car behind. On the other hand, the low reflectivity of the EC mirror is predetermined, namely, fixed at a certain level, so that it cannot be variously changed according to the extent of dazzle felt by the driver's eyes. Also there is a problem that it is difficult to set an optimum low reflectivity at which the driver will not be dazzled.

SUMMARY OF THE INVENTION

Therefore, the present invention has an object to provide a controller used with an EC mirror to automatically change the light reflectivity of the mirror surface stepwisely according to the intensity of the light beam from the headlights of a car behind.

It is another object of the present invention to provide an EC-mirror light reflectivity controller which is capable of controlling automatically and stepwisely the light reflectivity of the mirror surface according to the intensity of the light beam from the headlights of a car behind only when the brightness of the surroundings of a car including the brightness at the front thereof has become lower than a predetermined value.

It is still another object of the present invention to provide an EC mirror light reflectivity controller which is adapted so as to control automatically and stepwisely the light reflectivity of the mirror surface according to the intensity of the light beam from the headlights of a car behind only when the brightness of the surroundings of a car including the brightness at the front thereof has become lower than a predetermined value and to decolorize, when changing the reflectivity of the EC mirror from a low in a certain colored state to high in a more lightly colored state, the EC mirror once for a preset time and thereafter change the reflectivity to a higher reflectivity in the more lightly colored state.

These and other objects and advantages of the present invention will be better understood from the ensuing description made, by way of example, of the embodiments of the present invention with reference to the drawings.

DESCRIPTION OF THE PREFERRED EMBODIMENTS

One embodiment of the light reflectivity controller for EC mirror according to the present invention will be described below with reference to FIGS. 1 to 3.

Figure 1:
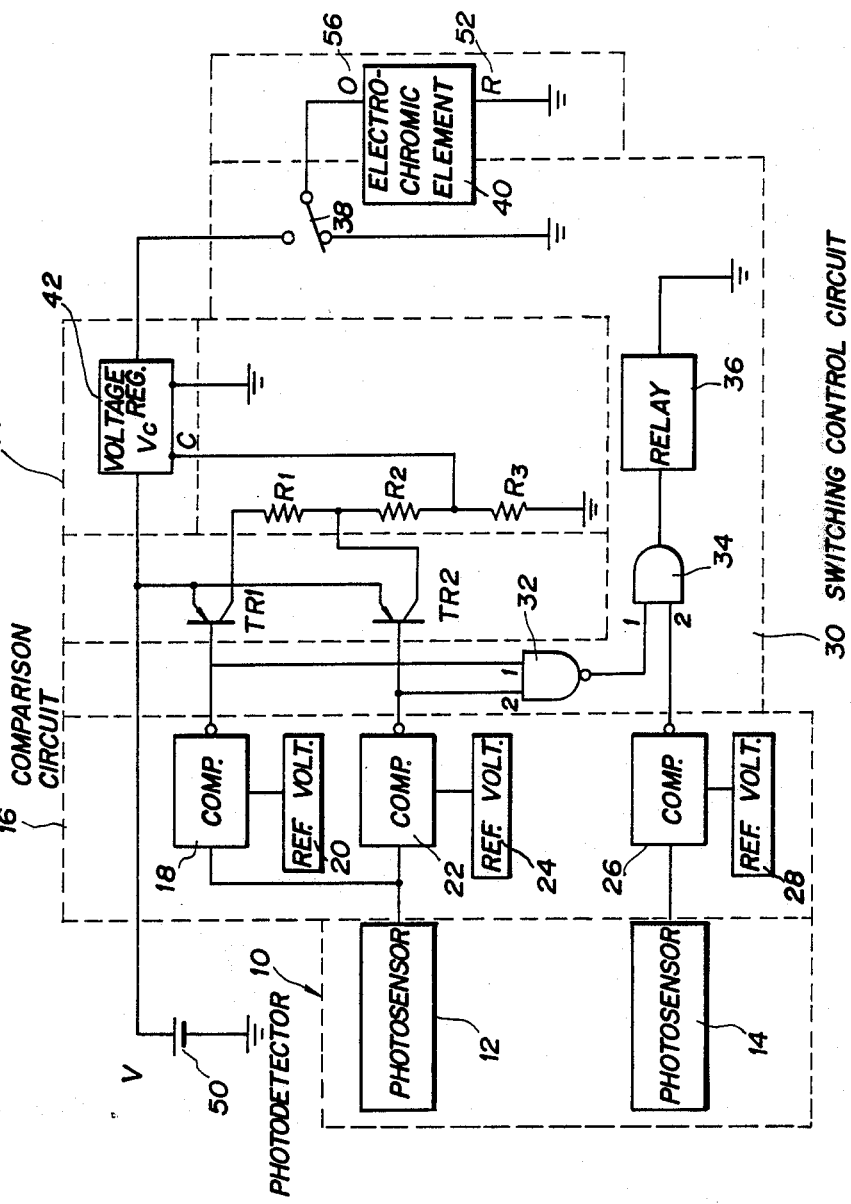
FIG. 1 is a circuit diagram showing a first embodiment of the light reflectivity controller according to the present invention.

Referring now to FIG. 1, the reference numeral 10 indicates a photodetector which detects the brightness of the surroundings of a car in which the EC mirror is equipped. This photodetector 10 is comprised of two photosensors 12 and 14, one being disposed on the rear side of the EC mirror while the other is disposed on the front side thereof. Each of these photosensors 12 and 14 comprises a detecting element and preamplifier. The photosensor 12 is so adapted as to detect the brightness X of the surroundings including the front of the car, while the photosensor 14 is to detect the brightness Y of the surroundings including the rear of the car. These photosensors 12 and 14 produce output signals, respectively, inversely proportional to the brightness X and Y, respectively, of the surroundings. The output signals from the photosensors 12 and 14, respectively, are sent t a comparison circuit 16. The comparison circuit 16 comprises two comparators 18 and 22 which receive output signal from the photosensor 12, and a comparator 26 which receives output signal from the photosensor 14. For the comparators 18, 22 and 26, respectively, disposed are reference voltage generation circuits 20, 24 and 28 which deliver a reference voltages ref1, ref2 and ref3, respectively. The signals ref1, ref2 and ref3 correspond to the brightness A, B and C (A > B > C), respectively, of the surroundings of the car as shown in FIG. 2. The reference voltages ref1, ref2 and ref3 are set as ref1 < ref2 < ref3. In this case, the brightness higher than A nearly corresponds to the sufficiently bright daylight, the brightness between A and B corresponds nearly to the twilight in which the surroundings are lightly dark, the brightness between B and C nearly corresponds to a brightness in the night but when the EC mirror is influenced by the light beam from the headlights from a car behind, and the brightness lower than C corresponds nearly to the brightness in the dark night.

The comparators 18, 22 and 26 are so adapted as to deliver a "L" level signal when the output signal from the photosensor 12 or 14 is higher than the corresponding reference voltages ref1, ref2 and ref3, while delivering an "H" level signal when the output signal from the photosensor is lower than the corresponding reference voltages ref1, ref2 and ref3.

The output terminals of the comparators 18 and 22 are connected to the first and second terminals, respectively, of a NAND gate 32 of which the output terminal is connected to the first terminal of an AND gate 34. The output terminal of the comparator 26 is connected to the second terminal of the AND gate 34 of which the output terminal is connected to the coil of a relay 36. When the coil of this relay 36 is not excited, a transparent electrode 56 at the side of an oxidation-colored thin layer 55 of an electrochromic element 40 shown in FIG. 3 and which will be described later is connected to the ground potential. When the coil of the relay 36 is excited, the contact 38 of the relay connects the transparent electrode 56 at the side of the oxidation-colored thin layer 55 to a voltage regulation circuit 42 which will be described later. The NAND gate 32, AND gate 34 and relay 36 form together a switching control circuit 30 which connects the transparent electrode 56 at the side of the oxidized chromic thin layer 55 to either the ground potential or the voltage regulation circuit 42 selectively based on the signals delivered from the comparators.

The output terminals of the comparators 18 and 22 are connected to the bases of transistors TR1 and TR2, respectively. These transistors TR1 and TR2 are of a PNP junction type. Each emitter is connected to the positive pole of a battery 50 and also to the input terminal of the voltage regulation circuit 42. When the signal level at the bases of these transistors TR1 and TR2 is "L" as compared with that at their emitters, each transistor is turned on as conductive between the emitter and collector thereof. The collector of the transistor TR1 is connected to one end of a resistor R1. Resistors R1, R2 and R3 are connected in series to one another, and the resistor R3 is connected to the ground potential. The transistor TR2 has the collector connected to the common terminal of the resistors R1 and R2. The common terminal of the resistors R2 and R3 is connected to a control input terminal C of the voltage regulation circuit 42. The resistors R1, R2 and R3 form together a voltage divider which forms a voltage control generation circuit 44 together with the voltage regulation circuit 42. When TR1 and TR2 are turned on, the control input terminal C of the voltage regulation circuit 42 is supplied with a voltage of $Vc = V \cdot R3/(R2+R3)$ and TR1 is on while TR2 is off, the control input terminal C of the voltage regulation circuit 42 is applied with a voltage of $Vc = V \cdot R3/(R1+R2+R3)$ (V is the voltage of the battery 50). In case TR1 is off while TR2 is on, the control input terminal C of the voltage regulation circuit 42 is supplied with a voltage of $Vc = V \cdot R3/(R2+R3)$. The battery 50 is so arranged as to provide the control voltage Vc applied to the control input terminal C.

Figure 3:
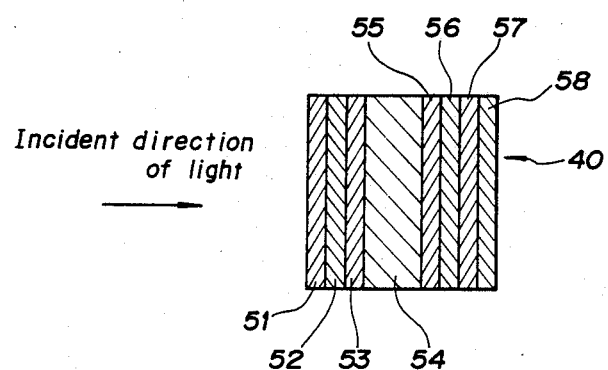
FIG. 3 is a schematic sectional view of the electrochromic element shown in FIG. 1.

The EC mirror using the electrochromic element 40 in this embodiment is shown in detail in FIG. 3. As seen, the EC mirror is comprised of a chromic lamination including the first transparent electrode 52 and a deoxidation-colored oxidized thin layer 53, electrolytic layer 54, oxidation-colored oxidized thin layer 55 and second transparent electrode 56 laminated on the first transparent electrode sequentially in this order, a transparent glass 57 outside the first transparent electrode 52 and also a transparent glass 57 outside the second transparent electrode 56 with an layer 53 is made of $WO_3$ or $MoO_2$, the electrolytic layer 54 is of a solid $Ta_2O_3$ or $ZrO_2$, and the oxidation-colored oxidized thin layer 55 is of $CrO_2$, $Ni(OH)_2$ or $Rh(OH)_2$. Assume now that the first transparent electrode 52 is placed at a negative potential while the second transparent electrode 56 is at a positive potential. The deoxidation-colored oxidized thin layer 53 is deoxidized and colored and at the same time the oxidation-colored oxidized thin layer 5 is oxidized and colored, so that the glass layer 51 has a low reflectivity as colored correspondingly to the potential. On the contrary, when the first transparent electrode 2 is let to have a positive potential while the second transparent electrode 56 is placed at a negative potential, the deoxidation-colored oxidized thin layer 53 is oxidized and becomes transparent and at the same time the oxidation-colored oxidized thin layer 55 is deoxidized and becomes also transparent, so that the glass layer 57 with the aluminum evaporated layer 58 at the back thereof will have a high reflectivity.

The EC mirror using such electrochromic element 40 is operated by the light reflectivity controller shown in FIG. 1 as will be described below:

(a) When the brightness X of the surroundings including the front of the car is higher than A, namely, when the brightness is nearly equivalent to the daylight brightness, the output from the photosensor 12 is lower than the reference voltage ref1. Therefore, the inputs to the comparators 18 and 22 are lower than the reference voltages ref1 and ref2, respectively, so that the outputs from the comparators 18 and 22 will have "H" level. The output signals from the comparators 18 and 22 are supplied to the first and second input terminals of the NAND gate 32. Since both these inputs have "H" level, the output signal from the NAND gate 32 has "L" level. This signal is supplied to the AND gate 34. When one of the inputs to the AND gate 34 is at "L" level, the output from this AND gate 34 will take "L" level irrespectively of any input to the AND gate 34, so that the coil of the relay 36 will not be excited and the relay contact 38 be kept connected to the ground potential as shown in FIG. 2. On the other hand, the output signal from each of the comparators 18 and 22 are also supplied to the transistors TR1 and TR2 of which the bases in turn will take "H" level. These transistors are turned on as conductive between the emitter and collector thereof. At this time, the control input terminal C of the voltage regulation circuit 42 is applied with a voltage of $V \cdot R3/(R2+R3)$. However, the relay contact 38 is kept connected to the ground potential. Namely, since both the electrode 56 at the side of the oxidation-colored oxidized thin layer 55 and the electrode 52 at the side of deoxidation-colored oxidized thin layer 53, of the electrochromic element 50, are short-circuited as connected to the ground potential, the glass layer 57 takes a high reflectivity. As described in the foregoing, when the brightness X of the surroundings including the front of the car is higher than A as shown in FIG. 2, the EC mirror will have a high reflectivity independently of the brightness Y of the surroundings including the rear of the car.

Figure 2:
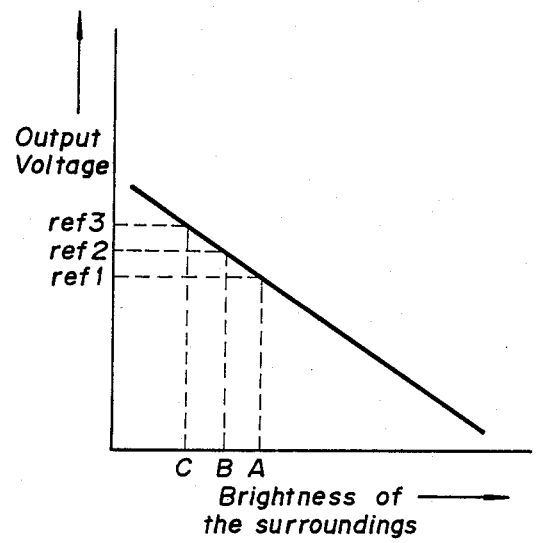
FIG. 2 graphically shows an output of the two photosensors shown in FIG. 1, which varies correspondingly to the brightness of the surroundings.

(b) Next, when the brightness Y of the surroundings including the rear of the car is lower than C as shown in FIG. 2, that is, when the brightness is nearly equivalent to the brightness in the night and it is not influenced by the light beam from the headlights of a car behind, the output from the photosensor 14 is higher than the reference voltage ref3 so that the output signal from the comparator 26 will take "L" level. The "L" level output signal from the comparator 26 is supplied to the second input terminal of the AND gate 34, but the output from the AND gate 34 takes "L" level irrespectively of the input signal from the NAND gate 32. Hence, the coil of the relay 36 is not excited and the relay contact 38 is connected to the ground potential as shown in FIG. 1. The light reflectivity of the EC mirror will be high as in the aforementioned case (a).

(c) When the brightness X of the surroundings including the front of the car is lower than A and higher than B shown in FIG. 2 and the brightness Y of the surroundings including the rear of the car is higher than C shown in FIG. 2, namely, when the brightness is nearly equivalent to that in the twilight and the light beam from the headlights of a car behind is incident upon the EC mirror, the output from the photosensor 12 is higher than the reference voltage ref1 and lower than ref2, so that the output signal from the comparator 18 will take "L" level while the output signal from the comparator 22 take "H" level. Since the output from the photosensor 14 is lower than the reference voltage ref3, the output signal from the comparator 26 will take "H" level. Therefore, the two input terminals of the NAND gate 32 are supplied with "L" and "H" level signals, respectively, from the comparators 18 and 22, respectively, so that the relay contact 38 is switched from the ground potential side to the output terminal of the voltage regulation circuit 42. On the other hand, the "L" and "H" level signals from the comparators 18 and 22, respectively, are supplied to the bases of the transistors TR1 and TR2, respectively, with the result that the transistor TR1 is turned on while the transistor TR2 is turned off. Hence, the control input terminal C of the voltage regulation circuit 42 is applied with a voltage of V.R3/(R1+R2+R3) which is delivered at the output terminal of the voltage regulation circuit 42. Since the relay contact 38 has been switched from the ground potential side to the output terminal of the voltage regulation circuit 42, the electrode 56 at the side of the oxidation-colored oxidized thin layer 55 of the electrochromic element 40 is applied with a voltage of V.R3/(R1+R2+R3). The electrodes 56 and 52 are colored depending upon this voltage. In this condition, the EC mirror will has the first low reflectivity.

(d) Next, when the brightness X of the surroundings including the front of the car is lower than B shown in FIG. 2 and the brightness Y of the surroundings including the rear of the car is higher than C and lower than B shown in FIG. 2, that is, when the surroundings of the car is very dark and the light beam from the headlights from a car behind is incident upon the EC mirror, the output from the photosensor 12 is higher than the reference voltage ref2 while the output from the photosensor 14 is lower then ref3 and higher than ref2. Therefore, both the output signals from the comparators 18 and 22 take "L" level while the output signal from the comparator 26 takes "H" level. The "L" level output signals from the comparators 18 and 22 are supplied to the bases of the transistors TR1 and TR2, respectively, which in turn will be turned on. As a result, the voltage regulation circuit 42 is applied at the control input terminal C thereof with a voltage V.R3/(R2+R3) which will be delivered from the voltage regulation circuit 42. On the other hand, both the "L" level output signals from the comparators 18 and 22 are supplied to the NAND gate 32 of which the output in turn will take "H" level. Both the "H" level output signal from the NAND gate 32 and the "H" level output signal from the comparator 26 are supplied to the AND gate 24 o which the output signal will take "H" level. Consequently, the coil of the relay 36 is excited so that the relay contact 38 will be switched to the output terminal of the voltage regulation circuit 42. As a result, the electrode 56 at the side of oxidation-colored oxidized thin layer 55 of the electrochromic element 40 is applied with a voltage of V R3/(R2+R3). The electrodes 56 and 52 are colored depending upon the voltage of V.R3/(R2+R3). The electrochromic element 40 has such a property that the higher the voltage applied between the electrodes, the more darkly the element is colored. Since the applied voltage of V.R3/(R2+R3) as in (c) above is higher than V.R3/(R1+R2+R3), the electrochromic element will be more darkly colored as compared with the coloring in (c). In this condition, the EC mirror has a second low reflectivity which is lower than the first low reflectivity.

As having been described in the foregoing, according to this embodiment, when the brightness X of the surroundings including the front of the car is sufficiently high and the brightness Y of the surroundings including the rear of the car is sufficiently low, the EC mirror will represent a high reflectivity; when the brightness X of the surroundings including the front of the car is nearly equivalent to that in the twilight in which the brightness is slightly low and also when the light beam from the headlights of a car behind is incident upon the EC mirror, the EC mirror will take a first low reflectivity which is somewhat lower; and when the brightness X of the surroundings including the front of the car is sufficiently low and the light beam from the headlights of a car behind is incident upon the EC mirror, the EC mirror will represent a second low reflectivity that is further lower than the first low reflectivity. Since the reflectivity is thus automatically changed over depending upon the brightness of the surroundings, the EC mirror can always keep providing a well-visible rear view without any dazzling of the driver by the light from the headlights of a car behind him.

Figure 4:
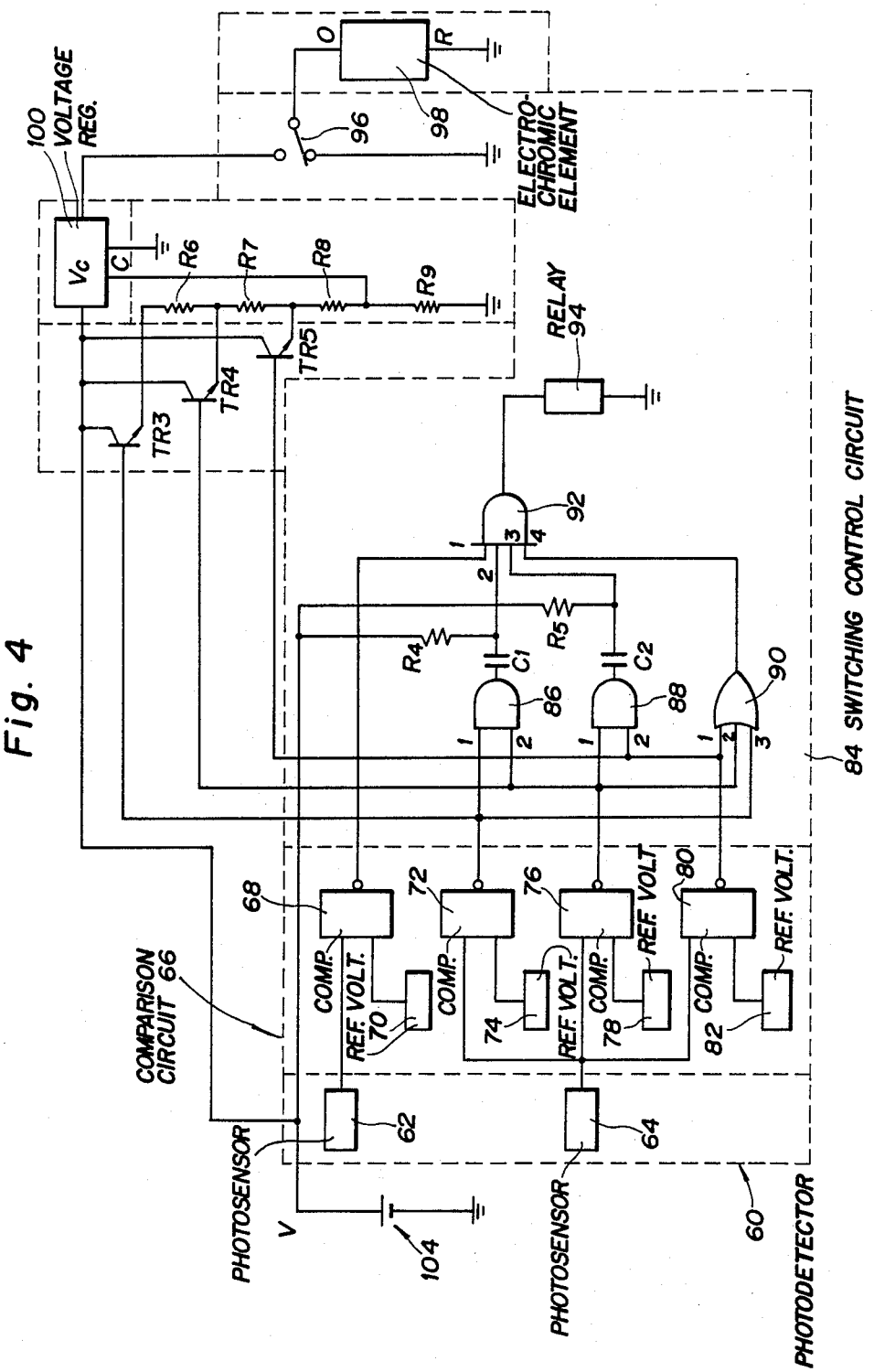
FIG. 4 is a circuit diagram of a second embodiment of the light reflectivity controller according to the present invention.
Figure 5:
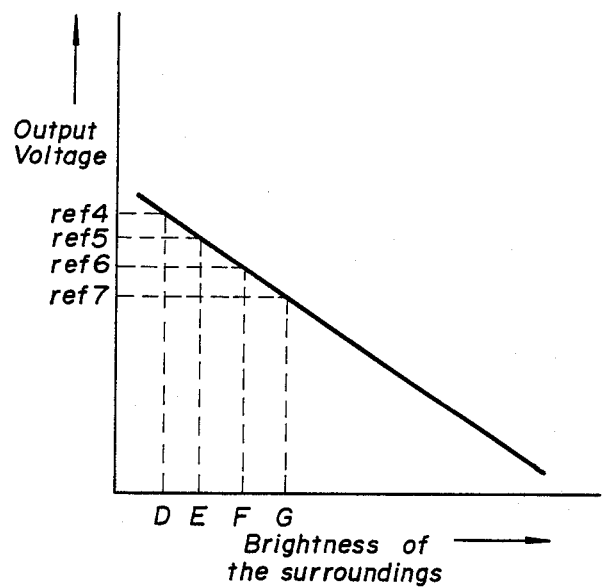
FIG. 5 graphically shows an output of the two photosensors shown in FIG. 4, which varies correspondingly to the brightness of the surroundings.

FIG. 4 shows a second embodiment of the light reflectivity controller for EC mirror according to the present invention. In FIG. 4, the reference numeral 60 indicates a photodetector which detects the brightness of the surroundings of a car in which the EC mirror is equipped. This photodetector 60 is comprised of two photosensors 62 and 64, one being disposed on the rear side of the EC mirror while the other is disposed on the front side thereof. Each of these photosensors 62 and 64 comprises a detecting element and preamplifier. The photosensor 62 is adapted so as to detect the brightness X of the surroundings including the front of the car, while the photosensor 64 is to detect the brightness Y of the surroundings including the rear of the car. These photosensors 62 and 64 produce output signals, respectively, inversely proportional to the brightness X and Y, respectively, of the surroundings. The output signals from the photosensors 62 and 64, respectively, are sent to a comparison circuit 66. The comparison circuit 66 comprises a comparator 68 which receives an output signal from the photosensor 62, and three comparators 72, 76 and 80 which receives output signal from the photosensor 64. For the comparators 68, 72, 76 and 78, respectively, disposed are reference voltage generation circuits 70, 74, 78 and 82 which deliver reference voltages ref4, ref5, ref6 and ref7, respectively. The signals ref4, ref5, ref6 and ref7 generally correspond to the brightness D, E, F and G (D<E<F<G), respectively, of the surroundings of the car. The reference voltages ref4, ref5, ref6 and ref7 are set as ref4>ref5>ref6->ref7.

When the signal from the photosensor 62 is higher than the reference voltage ref4, the comparator 68 delivers "H" level signal. In case the signal is lower than ref4, the comparator 68 provides "L" level signal. When the signal from the photosensor 64 is higher than the reference voltages ref5, ref6 and ref7, respectively, the comparators 72, 76 and 80 deliver "L" level signals. They will provide "H" level signals when the signal from the photosensor 64 is lower than ref5, ref6 and ref7, respectively.

The output terminal of the comparator 68 is connected to the first input terminal of an AND gate 92, while the output terminals of the comparators 72, 76 and 80 are connected to the first input terminals of an AND gate 86, AND gate 88 and OR gate 90, respectively. The output terminals of the comparators 72 and 76 are connected to the third and second input terminals, respectively, of the OR gate 90. The second input terminal of an AND gate 92 is connected to the output terminal of the AND gate 86 through a capacitor C1, and to the positive pole of a power source 104 through a resistor R4. The third input terminal of the AND gate 92 is connected to the output terminal of the AND gate 88 through a capacitor C2, and to the positive pole of the battery (power source) 104 through a resistor R5. The fourth input terminal of the AND gate 92 is connected to the output terminal of the OR gate 90. Also the first input terminal of the AND gate 86 and the third input terminal of the OR gate 90 are connected to the base of a transistor TR3, the second input terminal of the AND gate 86, the first input terminal of the AND gate 88 and the second input terminal of the OR gate 90 are connected to the base of a transistor TR4, and the second input terminal of the AND gate 88 and the first input terminal of the OR gate 90 are connected to the base of a transistor TR5. The transistors TR3 to TR5 are of NPN junction type. They are turned on as conductive between the emitter and collector thereof when the base has "H" level with respect to the emitter. Each collector is connected to the positive pole of the battery 104 and also to the input terminal of a voltage regulation circuit 100. Between the emitter of the transistor TR3 and the ground potential are connected to resistors R6, R7, R8 and R9 in series with one another. These resistors are disposed as follows. Namely, the resistor R6 is connected between the emitters of TR3 and TR4, respectively; R7 is between the emitters of TR4 and TR5, respectively; R8 is between the emitter of TR5 and the control input terminal of the voltage regulation circuit 100; and R9 is between the control input terminal C of the voltage regulation circuit 100 and the ground potential. These resistors R6 to R9 form together a voltage divider which form together with the voltage regulation circuit 100 a control voltage generation circuit 102 which changes a voltage Vc applied to the control input terminal C and makes the voltage the output of the voltage regulation circuit 100. Namely, this voltage Vc varies as any of the transistors TR3 to TR5 turns on in correspondence to the brightness of the surroundings of the car that is detected by the photosensors 62 and 64, and it is applied to an electrochromic element 98.

The AND gate 92 is so adapted that when all the signals supplied to the input terminals have "H" level, it will deliver "H" level signal to excite the coil of a relay 94, thereby switching a relay contact 96 for the voltage Vc to be applied to the electrochromic element 98. The AND gate 86, AND gate 88, OR gate 90, AND gate 92 and relay 94 form together a switching control circuit 84 which switches the electrode 0 at the side of the oxidation-colored oxidized thin layer of the electrochromic element 98 to either the output terminal of the voltage regulation circuit 100 or the ground potential correspondingly to the brightness of the surroundings of the car that is detected by the photosensors 62 and 64.

The AND gate 86, capacitor C1, resistor R4 and battery 104 form together a fist time-constant circuit, while the AND gate 88, capacitor C2, resistor R5 and battery 100 form together a second time-constant circuit.

The construction of the electrochromic element 98 is similar to that of the electrochromic element 40 adopted in the first embodiment shown in FIG. 3. The electrode 0 at the oxidation-colored oxidized thin layer is selectively connected to either the output terminal of the voltage regulation circuit 100 or the ground potential through the relay contact 96, while the electrode R at the side of the deoxidation-colored oxidized thin layer is connected to the ground potential. That is, the relay contact 96 is normally connected to the ground potential, and so the electrochromic element 98 is kept short-circuited. When the coil of the relay 94 is excited, the electrochromic element 98 is connected to the output terminal of the voltage regulation circuit 100 and is applied with a certain voltage corresponding to the brightness of the surroundings of the car.

The light reflectivity controller for EC mirror according to the second embodiment of the present invention functions as follows:

(a) When the brightness X of the surroundings including the front of the car is higher than D, the output from the photosensor 62, namely, the input to the comparator 68, is lower than the reference voltage ref4 and thus the output signal takes "L" level. Therefore, the 4-input AND gate 92 is supplied at the first input terminal thereof with "L" level signal, with the result that the output signal from the AND gate 92 takes "L" level irrespectively of the signal detected by the photosensor 64 so that the coil of the relay 94 will not be excited. Thus, the relay contact 96 is connected to the ground potential and the electrochromic element 98 is kept short-circuited. This means that the EC mirror has a high reflectivity.

(b) When the brightness X of the surroundings including the front of the car is lower than D, the output from the photosensor 64, namely, the input to the comparator 8, is higher than the reference voltage ref4, and so the output signal takes "H" level. Therefore, the 4-input AND gate 92 is supplied at the first input terminal thereof with "H" level signal. The output signal from the AND gate 92 takes "H" level when all the output signals from the AND gate 86, AND gate 88 and OR gate 90 are at "H" level, while the output signal of the AND gate 92 takes "L" level when any of the output signals from the AND gate 96, AND gate 88 and OR gate 90 is at "L".

It will be apparent from the above, the EC mirror reflectivity control is so made that the brightness X of the surroundings including the front of the car is higher than D, the EC mirror keeps a high reflectivity independently of the brightness of the surroundings including the rear of the car, while the reflectivity of the EC mirror is made low in correspondence to the brightness Y of the surroundings including the rear of the car when the brightness X is lower than D.

(c) When the brightness X of the surroundings including the front of the car is lower than D and the brightness Y of the surroundings including the rear of the car is lower than E, the output signal from the photosensor 64 is higher than all the reference voltages ref5, ref6 and ref7, so that the output signals from the comparators 72, 76 and 80 will represent "L" level. Since these output signals are supplied to the OR gate 90, the output signal from the OR gate 90 will take "L" level. Since this "L" level signal is also supplied to the fourth input terminal of the AND gate 92, the output signal from this AND gate 92 will also take the "L" level. Thus, since the coil of the relay 94 is not excited, the electrochromic element 98 is kept short-circuited so that the EC mirror will have a high reflectivity.

(d) Next, when the brightness X of the surroundings including the front of the car is lower than D and the brightness Y of the surroundings including the rear of the car is above E and less than F, that is, when the brightness Y of the surroundings including the rear of the car is slightly increased up to $E \leq Y < F$, the input signals to the comparators 72, 76 and 88 are lower than ref5 but higher than ref6 and ref7. Therefore, the output signal of the comparator 72 will take "H" level while the output signals from the comparators 76 and 80 will have "L" Level. Since the "H" level output signal from the comparator 72 is supplied to the base of the transistor TR3 while the "L" level output signals from the comparators 76 and 80 are supplied to the bases of the transistors TR4 and TR5, respectively, TR3 is turned on while the TR4 and TR5 are turned off. The "H" level output signal from the comparator 72 is further supplied to the first input terminal of the AND gate 86 and the third input terminal of the OR gate 90, the "L" level output signal from the comparator 76 is also supplied to the first input terminal of the AND gate 88 and the second input terminal of the OR gate 90, and the "L" level output signal from the comparator 80 is further supplied to the second input terminal of the AND gate 88 and the first input terminal of the OR gate 90, so that both the output signals from the AND gates 86 and 88 will take "L" level. As a result, the voltage regulation circuit 100 is applied at the control input terminal C thereof with a voltage of $V.R9/(R6+R7+R8+R9)$ which will be the output voltage from the voltage regulation circuit 100. Also the output signal from the OR gate 90 takes "H" level and has been supplied to the fourth input terminal of the AND gate 92. Both the output signals from the AND gates 86 and 88 take "L" level. However, since C1 and C2 will be completely charged when a time determined by a first time-constant circuit including C1 and R1 and a second time-constant circuit including C2 and R5, that is, a time from the connection of R4 and R5 to the battery 104 until $T1=C1.R4$ and $T2=C2.R5$, passes, the potentials at the second and third input terminals of the AND gate 92 take "H" level, and at the same time the output signal from the AND gate 92 also takes "H" level. Thus, the coil of the relay 94 is excited and the relay contact 96 is connected to the output terminal of the voltage regulation circuit 100, so that the electrode 0 at the side of the oxidation-colored oxidized thin layer of the electrochromic element 98 is applied with the aforementioned voltage of $V.R9/(R6+R7+R8+R9)$ so that the EC mirror will be colored and represent a first low reflectivity.

(e) In case the brightness Y of the surroundings including the rear of the car is further increased up to $F \leq Y < G$, the input signals to the comparators 72, 76 and 80 are higher than the reference voltages ref5 and ref6 but higher than ref7 so that the output signals from the comparators 72, 76 and 80 will have "H", "H" and "L" levels, respectively. Thus, the output signals from the AND gate 86 and OR gate 90 take "H" level, respectively, while the output signal from the AND gate 88 maintains "H" level. Therefore, the signals supplied to the second and fourth input terminals of the AND gate 92 represent "H" level, while the signal supplied to the third input terminal keeps "H" level as mentioned above. Since the potential in the capacitor C1 at the side of R4 is at "H" level although the output signal from the AND gate 86 has changed from "L" to "H" level, the signal supplied to the second input terminal of the AND gate 92 remains at "H" level. However, at this time, the capacitor C1 has been discharged in a circuit comprising the battery 104, resistor R4, capacitor C1 and AND gate 86. Hence, since all the four input signals to the AND gate 92 are held at "H" level, the output signal will also take "H" level so that the coil of the relay 94 will be kept excited and the relay contact 96 will remain connected to the voltage regulation circuit 100. On the other hand, since the transistors TR3 and TR4 are turned on, the voltage regulation circuit is applied at the control input terminal thereof with a voltage of $V.R9/(R7+R8+R9)$ which will be applied to the electrode O at the side of the oxidation-colored oxidized thin layer of the electrochromic element 98. This voltage is higher than the voltage of $V.R9/(R6+R7+R8+R9)$ in the preceding case. In case the brightness Y of the surroundings including the rear of the car is increased, the voltage applied to the electrode O at the side of the oxidation-colored oxidized thin layer of the electrochromic element 98 becomes higher so that the EC mirror will has a decreased reflectivity. It will be apparent that the light reflectivity of the EC mirror becomes the second low reflectivity that is further lower than the aforementioned first low reflectivity.

(f) In case the brightness Y of the surroundings including the rear of the car increases up to $Y \geq G$, the relay contact 96 is kept connected to the output terminal of the voltage regulation circuit 100 as in the case of $F \leq Y < G$. On the other hand, since all the output signals from the comparators 72, 76 and 80 take "H" level, all the transistors TR3 to TR5 are turned on so that the voltage regulation circuit 100 is applied at the control input terminal C thereof with a voltage of $V.R9/(R8+R9)$ which will be applied to the electrode 0 at the side of the oxidation-colored oxidized thin layer of the electrochromic element 98. Since this voltage is higher than the voltage of V.R9/(R7+R8+R9) being the voltage applied in case of F≦Y<G, the EC mirror is more darkly colored so that the light reflectivity thereof will further fall down to a third low reflectivity that is further lower than the aforementioned first and second low reflectivities.

(g) Next, if the brightness Y of the surroundings including the rear of the car decreases from Y≧G to F≦Y<G, the input signals to the comparators 72, 76 and 80 are lower than ref5 and ref6 while being higher than ref7, so that the output signals from the comparators 72 and 76 keep "H" level while the output signal from the comparator 80 is changed from "H" to "L" level. Consequently, the transistors TR3 and TR4 remain turned on while the transistor TR5 is turned off, so that the voltage applied to the control input terminal of the voltage regulation circuit 100 is switched from V.R9/(R8+R9) to V.R9/(R7+R8+R9). On the other hand, since the output signals from the AND gate 86 and OR gate 90 keep "H" level, "H" level signal is transmitted to the second and fourth input terminals of the AND gate 92. However, the AND gate 88 is supplied at the first input terminal thereof with "H" level signal as it is from the comparator 80 but since "L" level signal from the comparator 80 is supplied to the second input terminal, the output signal from the AND gate 88 will take "L" level. In case the output signal from the AND gate 88 takes "L" level, the signal level at the terminal of the capacitor C2 at the side of the AND gate 88 takes "L" level (ground potential) so that the terminal of the capacitor C2 in a discharged condition at the side of resistor R5 also takes "L" level. Thus, the AND gate 92 will be supplied at the third input terminal thereof with "L" level signal. Consequently, the output signal from the AND gate 92 also takes "L" level so that the coil of the relay 94 is not excited with the result that the relay contact 96 will be switched to the ground potential and the electrode O at the side of the oxidation-colored oxidized thin layer of the electrochromic element 98 will take the ground potential level as with the electrode R at the deoxidation-colored oxidized thin layer, thereby decolorizing the EC mirror. However, since the capacitor has started being charged through the resistor R5, the charging is completed when a time of T2=C2×R5 has passed and the terminal of the capacitor C2 at the side of the resistor R5 will restore to "H" level. Therefore, all the input signals to the AND gate 92 take "H" level with the result that the coil of the relay 94 will be excited with the "H" level output signal from the AND gate 92, the relay contact 96 be switched to the output terminal of the voltage regulation circuit 100 and the electrode O at the side of the oxidation-colored oxidized thin layer of the electrochromic element 98 be applied with a voltage of V.R9/(R7+R8+R9). Thus it will be apparent that the EC mirror is slightly less colored than in the case of Y≧G and takes the second low reflectivity.

(h) Next, when the brightness Y of the surroundings including the rear of the car is decreased from a range of F≦Y<G to a range of E≦Y<F, the transistors TR3 and TR5 remain turned on and off, respectively, and the transistor TR4 is switched from on to off state. At this time, the signal supplied to the second input terminal of the AND gate 86 has "L" level so that the signal supplied to the second input terminal of the AND gate 86 keeps "L" level for a time of T1=C1.R4 during which the output signal from the AND gate 92 also takes "L" level. Therefore, as the relay contact 96 is switched to the ground potential, the electrode O at the side of the oxidation-colored oxidized thin layer of the electrochromic element 98 takes the ground potential level as with the electrode R at the deoxidation-colored oxidized thin layer, so that the EC mirror is decolorized. Further, when a time T1 passes, the relay contact 96 is switched to the output terminal of the voltage regulation circuit 100 again. So the electrode O at the side of the oxidation-colored oxidized thin layer is applied with a voltage V.R9/(R6+R7+R8+R9). Thus it will be appreciated that the EC mirror is further decolorized down to the first low reflectivity.

(i) hen the brightness Y of the surroundings including the rear of the car is further decreased from a range of E≦Y<F to a range of Y≦E, the output signal from the OR gate 90 takes "L" level so that the output signal from the AND 92 also takes "L" level with the result that the coil of the relay 94 gets non-excited. Thus, the relay contact 96 is switched to the ground potential, the electrode O at the side of the oxidation-colored oxidized thin layer of the electrochromic element 98 takes the ground potential as with the electrode R at the deoxidation-colored oxidized thin layer, and the EC mirror gets the high reflectivity as decolorized.

As having been described in the foregoing, according to this embodiment, the comparator 68 which provides a reference voltage ref4 is provided for the photosensor 62 and three comparators 72, 76 and 80 which produce reference voltages ref5, ref6 and ref7 are disposed for the photosensor 64. It will be evident that the number of the comparators and the reference voltages may be variously set.

Also according to the embodiment, such an arrangement is made that the voltage applied to the electrode O at the side of the oxidation-colored oxidized thin layer of the electrochromic element 98 is changed depending upon the brightness X of the surroundings including the front of the car and brightness Y of the surroundings including the rear of the car. However, in case the brightness X of the surroundings including the front of the car is substantially X≧D, the voltage applied to the electrode O at the side of the oxidation-colored oxidized thin layer of the electrochromic element 98 takes the ground potential level and the EC mirror has the high reflectivity independently of the brightness Y of the surroundings including the rear of the car. So in case the brightness X of the surroundings including the front of the car is within a range of X<D, namely, in case of rather dark surroundings, the light reflectivity can be controlled automatically and stepwisely correspondingly to the brightness Y of the surroundings including the rear of the car, namely, the brightness due to the light beam from the headlights of a car behind. Only when the brightness Y of the surroundings including the rear of the car is higher than E which is higher than D, the EC mirror will be colored. Further, in case the reflectivity of the EC mirror is changed from low to high, for example, when the strong light beam incident upon the EC mirror from the headlights of a car behind suddenly leave the EC mirror, the electrode O at the side of the oxidation-colored oxidized thin layer of the electrochromic element 98 and the electrode R at the side of deoxidation-colored oxidized thin layer are short-circuited between them once for a short time determined by the time-constant circuits, the EC mirror is decolorized and thereafter the mirror's reflectivity is shifted to the high one. So the delay in transition of the electrochromic element 98 can be effectively eliminated so that the light reflectivity of the reflective surface of the mirror can be changed in a very short time correspondingly to the brightness of the surroundings of the car. Thus the EC mirror can be made very easily viewable.

The present invention has been described in the foregoing with respect to the first and second embodiments of the present invention. However, it will be evident to those skilled in the art that the present invention is not limited to these embodiments alone but various many modifications and corrections can be done of the present invention.

What is claimed is:

1. A light reflectivity controller for use with an automotive rearview mirror having an electrochromic element on each of the reflective surfaces thereof, comprising:
   a first photosensor for detecting the brightness of the surroundings including the front of a car in which the inside rearview mirror is equipped, to provide a signal corresponding to the detected brightness;
   a second photosensor for detecting the brightness of the surroundings including the rear of the car to provide a signal corresponding to the detected brightness;
   first means for comparing the output signal delivered from said first photosensor with at least a reference value predetermined correspondingly to the brightness of the surroundings of the car to provide at least a first control signal formed based on the result of the comparison;
   second means for comparing the output signal delivered from said second photosensor with at least a reference value predetermined correspondingly to the brightness of the surroundings of the car to provide a second control signal formed based on the result of the comparison;
   the reference values in said first and second comparing means corresponding to different brightnesses of said surroundings of the car;
   a control voltage generating means for generating different voltages for application to said electrochromic elements on said reflective surfaces;
   a first switching means for delivering to said control voltage generating means a third control signal in accordance with one of said different voltages to be delivered based on said plural control signals received from said first and second comparing means;
   a second switching means for connecting said electrochromic elements selectively between said control voltage generating means and the ground potential based on said plural control signals delivered from said first and second comparing means, whereby the voltages applied to said electrochromic elements are controlled automatically and stepwisely based on the brightness of the surroundings of the car; and
   a timer circuit adapted so as to recognize, from the change of the control signal delivered from said second comparing means, that the voltage delivered from said control voltage generating means should be changed from the predetermined voltage to any other lower voltage, and to act on said second switching means to let the latter connect said electrochromic elements to the ground potential for a predetermined short time and thereafter to said control voltage generating means.

2. A light reflectivity controller according to claim 1, in which said second switching means is so adapted that said electrochromic elements are connected to the ground potential when the output signal from said first photosensor is higher than a predetermined reference value of said first comparing means that corresponds to a predetermined brightness of the surroundings including the front of the car or when the output signal from said second photosensor is lower than the predetermined reference value of said first comparing means that corresponds to the predetermined brightness of the surroundings including the front of the car.

3. A light reflectivity controller according to claim 1, in which said electrochromic elements are connected to said control voltage generating means when the output signal from said first photosensor is lower than a predetermined reference value of said first comparing means that corresponds to a predetermined brightness of the surroundings including the front of the car.

4. A light reflectivity controller utilized with an automotive rearview mirror having an electrochromic element therein, comprising:
   first photosensor means for detecting the brightness associated with the front of a car in which said rearview mirror is equipped and for providing a signal corresponding to the detected brightness;
   second photosensor means for detecting the brightness associated with the rear of the car and for providing a signal corresponding to the detected brightness;
   first comparing means for comparing the signal provided by said first photosensor means with a reference value and for providing a first control signal based on the comparison result;
   second comparison means for comparing the signal provided by said second photosensor means with a plurality of reference values and for providing a plurality of second control signals based on the comparison result;
   a control voltage generating means for generating different levels of voltage to said electrochromic element, said different levels of voltage being determined in accordance with said first control signal and said plurality of second control signals;
   switching means for selectively connecting said electrochromic element between said control voltage generating means and ground potential in accordance with said first control signal and said plurality of control signals so as to stepwisely change the reflectivity of said rearview mirror by altering the voltage applied to said electrochromic element; and
   timer means for forcing said switching means to connect said electrochromic element to the ground potential for a predetermined period of time and thereafter to said control voltage generating means in which would require a lower voltage to be applied to said electrochromic element and thus effect a change in the reflectivity of said rearview mirror.

* * * * *